(12) United States Patent
Du et al.

(10) Patent No.: US 11,175,841 B2
(45) Date of Patent: Nov. 16, 2021

(54) WRITE MANAGEMENT OF FLASH MEMORY

(71) Applicant: Silicon Motion, Inc., Hsinchu County (TW)

(72) Inventors: Jian-Dong Du, Taoyuan (TW); Chia-Jung Hsiao, New Taipei (TW); Tsung-Chieh Yang, Hsinchu (TW)

(73) Assignee: Silicon Motion, Inc., Hsinchu County (TW)

( * ) Notice: Subject to any disclaimer, the term of this patent is extended or adjusted under 35 U.S.C. 154(b) by 5 days.

(21) Appl. No.: 16/735,709

(22) Filed: Jan. 7, 2020

(65) Prior Publication Data
US 2020/0310648 A1 Oct. 1, 2020

(30) Foreign Application Priority Data

Apr. 1, 2019 (TW) .................................. 108111476

(51) Int. Cl.
*G06F 3/06* (2006.01)
*G06F 12/02* (2006.01)
(52) U.S. Cl.
CPC ............ *G06F 3/064* (2013.01); *G06F 3/0604* (2013.01); *G06F 3/0653* (2013.01); *G06F 3/0659* (2013.01); *G06F 3/0679* (2013.01); *G06F 12/0246* (2013.01); *G06F 12/0253* (2013.01); *G06F 2212/1044* (2013.01); *G06F 2212/7205* (2013.01)

(58) Field of Classification Search
None
See application file for complete search history.

(56) References Cited

U.S. PATENT DOCUMENTS

| | | | |
|---|---|---|---|
| 2005/0091445 A1* | 4/2005 | Chang | G06F 12/0246 711/103 |
| 2008/0082728 A1 | 4/2008 | Traister | |
| 2010/0172179 A1* | 7/2010 | Gorobets | G06F 12/0866 365/185.09 |
| 2012/0331208 A1* | 12/2012 | Chang | G06F 12/0246 711/103 |
| 2013/0067138 A1* | 3/2013 | Schuette | G06F 3/0679 711/103 |
| 2015/0058530 A1* | 2/2015 | Reddy | G06F 3/064 711/103 |
| 2016/0179664 A1 | 6/2016 | Camp | |
| 2017/0286288 A1* | 10/2017 | Higgins | G06F 11/1048 |

FOREIGN PATENT DOCUMENTS

| | | |
|---|---|---|
| CN | 108874309 A | 11/2018 |
| TW | 201426305 A | 7/2014 |
| TW | 201606506 A | 2/2016 |

* cited by examiner

Primary Examiner — Kevin Verbrugge
(74) Attorney, Agent, or Firm — Winston Hsu

(57) ABSTRACT

A method for use in management of a flash memory module is provided. The flash memory module has a plurality of blocks, wherein a portion of the blocks belong to a spare pool. The method includes: preserving at least one erased block in the spare pool for a write operation; monitoring an erasing period regarding the at least one erased block; and performing a replacement operation to replace the at least one erased block when the erase time exceeds a threshold.

15 Claims, 4 Drawing Sheets

WRITE MANAGEMENT OF FLASH MEMORY

BACKGROUND OF THE INVENTION

1. Field of the Invention

The present invention relates to a flash memory, and more particularly, to a method for managing blocks in a flash memory that are going to be written, and an associated controller and storage device.

2. Description of the Prior Art

In general, the flash memory controller searches for an available erased block in the flash memory according to the writing command delivered by the host, in order to perform data writing. However, if being under the erase state for too long, the flash memory unit may suffer from some unrecoverable physical damages. Therefore, there is a need for a novel writing management scheme to prevent the above problem.

SUMMARY OF THE INVENTION

In view of the above, an objective of the present invention is to provide a writing management scheme of a flash memory. The present invention uses a portion of blocks divided from a flash memory as a spare pool. The controller selects blocks from the spare pool for data writing in order to complete the writing command delivered by the host. Note that the aforementioned spare pool only preserves very a limited amount of erased blocks, and the rest of space are used to preserve written blocks (e.g. programmed blocks). When the controller receives writing commands from the host, the controller will search for erased blocks preserved in the spare pool in order to write data into them. After the writing is finished, the controller will perform erasing operations on one or more written blocks in the spare pool, and take them as new preserved blocks. In this way, the amount of erased blocks within the blocks of the flash memory can be decreased.

In another aspect, the controller creates the time file (e.g. the timestamp) thereof for each erased block preserved in the spare pool, in order to for monitor the duration the block remains in the erase state. Once the duration of said erased block exceeds a specific threshold, the controller will perform writing on this erased block, and choose one or more blocks among the written blocks in the spare pool, in order to reduce the extent of physical damages.

An embodiment of the present invention proposes a method for managing a flash memory module. The flash memory module comprises a plurality of blocks, wherein a portion of the plurality of blocks belongs to a spare pool. The method comprises: preserving at least one erased block in the spare pool to facilitate a writing operation; monitoring an erasing period of the at least one erased block; and when the erasing period exceeds a threshold, executing an alternative operation to replace the at least one erased block.

An embodiment of the present invention proposes a controller for managing a flash memory module, wherein the flash memory module comprises a plurality of blocks, a portion of the plurality of blocks belongs to a spare pool. The controller comprises a storage unit and a processing unit. The storage unit is arranged to store a program code. The processing unit is coupled to the storage unit, and is arranged to read the program code from the storage unit in order to execute the program code to perform following operations: preserving at least one erased block in the spare pool to facilitate a writing operation; monitoring an erasing period of the at least one erased block; and when the erasing period exceeds a threshold, executing an alternative operation to replace the at least one erased block.

An embodiment of the present invention proposes a storage device which comprises a flash memory module and a controller. The flash memory module comprises a plurality of blocks, wherein a portion of the plurality of blocks belongs to a spare pool. The controller is arranged to access the flash memory module, and comprises a storage unit and a processing unit. The storage unit is arranged to store a program code. The processing unit is coupled to the storage unit, wherein the processing unit is arranged to read the program code from the storage unit in order to execute the program code, and thereby performs following operations: preserving at least one erased block in the spare pool to facilitate a writing operation; monitoring an erasing period of the at least one erased block; and when the erasing period exceeds a threshold, executing an alternative operation to replace the at least one erased block.

These and other objectives of the present invention will no doubt become obvious to those of ordinary skill in the art after reading the following detailed description of the preferred embodiment that is illustrated in the various figures and drawings.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well known materials or methods have not been described in detail in order to avoid obscuring the present embodiments.

Additionally, any examples or illustrations given herein are not to be regarded in anyway as restrictions on, limits to, or express definitions of any term or terms with which they are utilized. Instead, these examples or illustrations are to be regarded as being described with respect to one particular embodiment and as being illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such non-limiting examples and illustrations includes, but is not limited to: "for example," "for instance," "e.g.," and "in one embodiment."

The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

Figure 1:
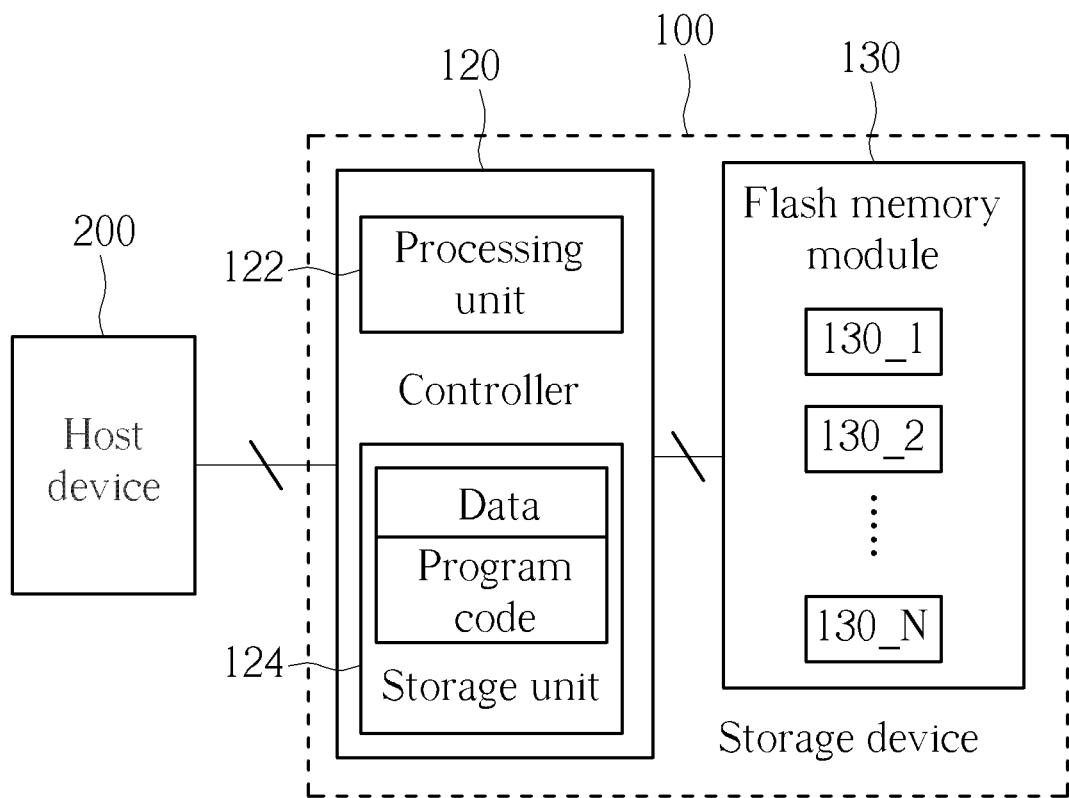
FIG. 1 is a diagram illustrating the architecture of a storage device, an associated controller and a flash memory module according to an embodiment of the present invention.

FIG. 1 illustrates the architecture of a storage device 100, an associated controller 120 and a flash memory module 130 according to an embodiment of the present invention. As shown in FIG. 1, the storage device 100 comprises a controller 120 and a flash memory module 130, and is controlled by a host device 200, wherein the storage device 100 may be part of the host device 200. The host device 200 may comprise at least one central processing unit (CPU) (not shown) to control operations of the host device 200 via operating an operating system (OS) and an application, in order to interact with peripheral devices. The storage device 100 may provide storage space for the host device 200 as well as program codes and the data necessary for the storing operations of the OS and various applications. Examples of the host device 50 may comprise (but are not limited to): a multifunctional mobile phone, tablet, wearable device and personal computer (such as a desktop or laptop computer). Examples of the storage device 100 may comprise (but are not limited to): solid state drives (SSD) and various types of embedded storage devices (e.g. the storage devices that conform to the UFS or EMMC specifications).

The controller 120 may access the flash memory module 130. In one embodiment, the flash memory module 130 may be a stereo (also dubbed as 3D) NAND flash, and may comprise at least one flash memory chip, but this is not meant to be a limitation of the present invention. Each flash memory chip may comprises a plurality of blocks, and the controller 120 may use "block" as the unit of performs data erasing on the flash memory module 130. Further, a block may record a specific number of pages, and the controller 120 may use "page" as the unit to write data into the flash memory module 130.

The controller 120 may comprise a processing circuit (e.g. the microprocessor 122 and the storage unit 124), such as a read only memory (ROM). The ROM 124 is mainly used for storing program codes and specific data, and the microprocessor 122 is used for executing program codes to control the access of the flash memory module 130. Further, the controller 120 may comprise one or more interface logics for assisting the operations described later, such as control logics, buffers, etc., but those elements are omitted here for brevity. After reading the following contents, one skilled in the art should be readily to know how to properly combine well known circuits with the circuit elements and architectures disclosed in the present invention, and can thereby implement various operations and associated applications mentioned in the embodiments of the present invention.

In this embodiment, the host device 200 may indirectly access the storage device 100 by transmitting a host command and the corresponding logic address to the controller 120. The controller 120 receives the host command (e.g. a reading command or a writing command) as well as the logic address, and translates the host command into a memory-operating command and then uses the operating command to control the flash memory module 130 to perform reading, writing, programming or erasing on memory units, pages or blocks of a specific physical address in the flash memory module 130. Moreover, the controller 120 may also execute the program code, and/or execute a series of operations according to data in the storage unit 124 in order to perform a series of operations to implement the specific operation mentioned in the follows.

Figure 2:
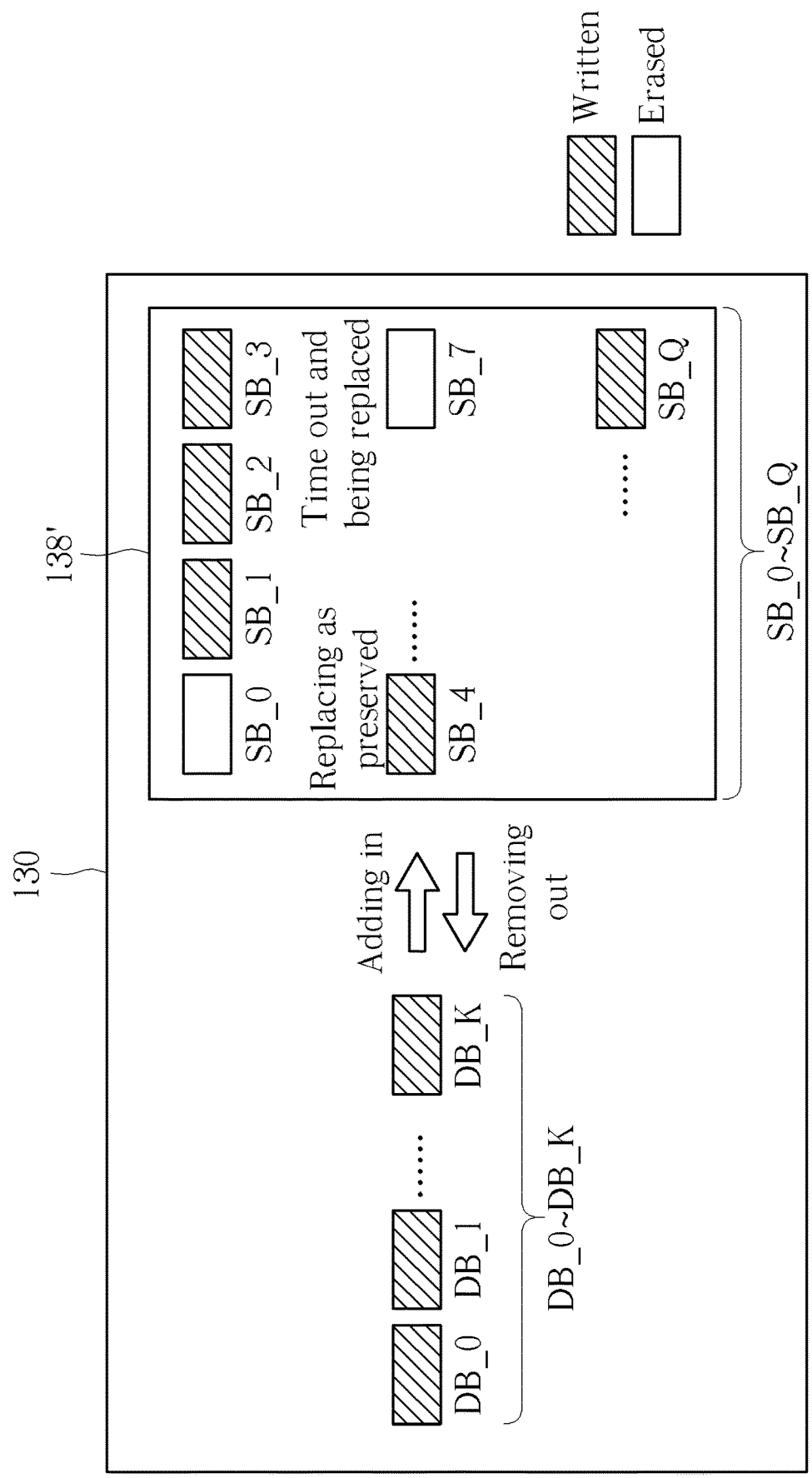
FIG. 2 is a diagram illustrating the interactions between a flash memory module and a spare pool according to an embodiment of the present invention.

FIG. 2 is a diagram illustrating the interactions between a flash memory module and a spare pool according to an embodiment of the present invention. As shown in FIG. 2, the flash memory module 130 comprises multiple blocks, and these blocks may be distributed in the flash memory chips 130_1-130_N. In addition, some blocks in the flash memory module 130 may be categorized as a spare pool 138. The spare pool 138 may comprise the blocks SB0-SBQ, and theses blocks may either store no data or may store invalid data (e.g. which is also stored in other blocks and does not need to be further updated). In the present invention, all the writing commands issued from the host device 200 will trigger the controller 120 to select one or more blocks from the spare pool 138 and perform writing (e.g. writing data into one or more pages of a block) according to the data comprised in the writing commands that are issued from the host device 200. When one or more blocks are written due to the writing commands issued from the host device 200, those blocks will be removed from the spare pool 138, and then the controller 120 will select one or more blocks storing invalid data among the blocks DB0-DBK which are not currently included in the spare pool 138, in order to compensate the spare pool 138.

In the present invention, the controller 120 will preserve at least one erased block (e.g. block SB_0) which is in the erase state in the spare pool 138, and this is because erasing a block may consume a considerable amount of time. However, the lagging resulted from the writing operation may be mitigated by performing erasing operations. When the host device 200 issues writing commands to the controller 120, the controller 120 will write the data issued from the host into the erased block SB_0 which is preserved in the spare pool 138. Further, before the host device 200 issues the next writing command to the controller 120, the controller 120 will seek for at least one block (e.g. the block SB_3) from the written/programmed blocks SB_1-SB_Q in the spare pool 138, and then erase the at least one block for follow-up writing operations.

Figure 3:
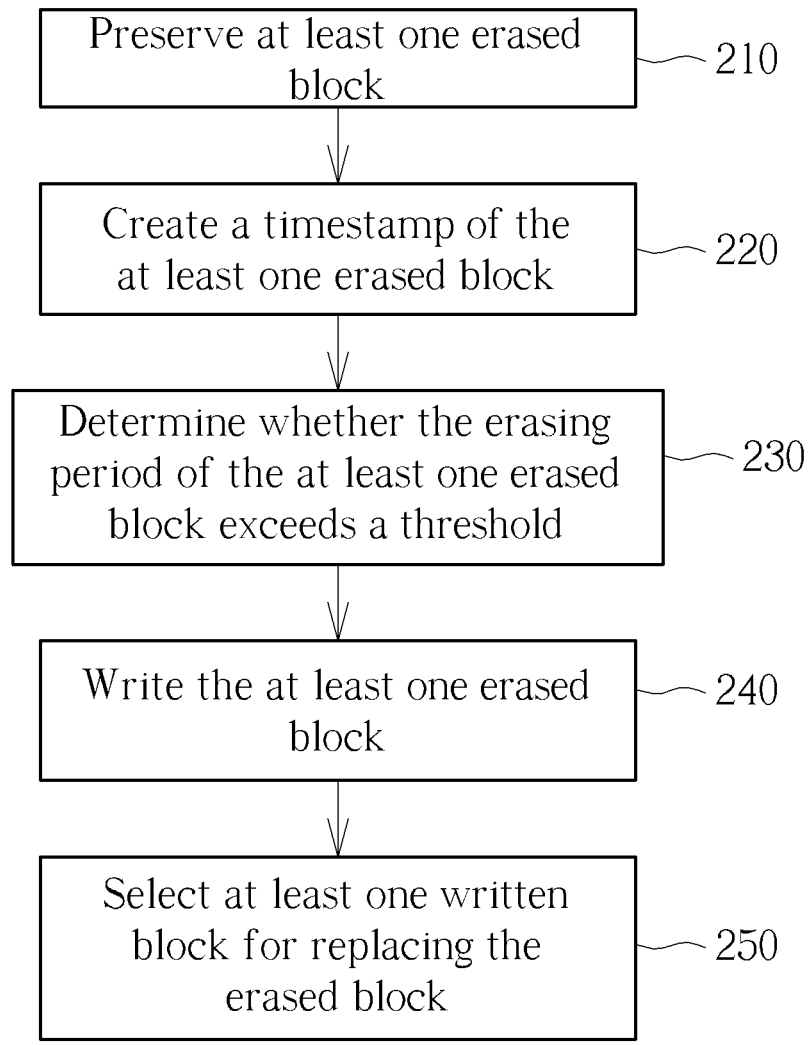
FIG. 3 is a flowchart illustrating a method for managing the writing of blocks of a flash memory according to an embodiment of the present invention.

As mentioned above, however, if a block stays in the erase state too long, units thereof might suffer from irreversible physical damages. Hence, the method of the present invention may manage the erased blocks in the spare pool, and after a certain amount of time, those erased blocks will be written with data so as to prevent potential damages. Please refer to the FIG. 3, which is a flowchart illustrating a method for managing writing of blocks of a flash memory according to an embodiment of the present invention, and can be summarized as follows:

Step 210: Preserve at least one erased block.
Step 220: Create a timestamp of the at least one erased block.
Step 230: Determine whether the erasing period of the at least one erased block exceeds a threshold.
Step 240: Write the at least one erased block.
Step 250: Select at least one written block for replacing the erased block.

In Step 210, the controller 120 performs erasing an operation on at least one written block in the spare pool 138, to make the at least one written block (e.g. SB_7) be converted into an erase state from a written state (e.g. a programmed state), as a preparation for future writing operations. Step 210 may take place before the host device 200 issues a writing command, or after the controller 120 performs writing on another erased block. In Step 220, the controller 120 creates a timestamp of the at least one erased block. In Step 230, the controller 120 refers to the time information and system time in the timestamp to determine whether the time the at least one erased block is in the erase state exceeds a threshold. This step is meant to protect erased blocks from suffering, to prevent it from suffering unrecoverable physical damage. If the determination result in Step 230 is "Yes", the flow goes to Step 230; if not, the flow stays in the current step. In Step 240, since the controller 120 already finds that the erasing period of the at least one erased block has exceeded the threshold, which suggests that the erased block is in danger of being damaged, the controller 120 will perform writing on the at least one erased block to convert the block from the erase state to the written state, in order to prevent some potential damages.

Further, according to an embodiment, the controller 120 may utilize the opportunity of writing to erased blocks, and perform a garbage collection operation in the meantime. The controller 120 writes to the at least one erased block according to the data collected from the valid pages of the blocks DB0-DBK, in order to convert the at least one erased block into a written block. After that, the flow goes to Step 250, the controller 120 will search for at least one written block (e.g. SB_4) in the spare pool 138 to replace the aforementioned at least one erased block, and then the flow goes back to Step 210 to perform erasing operation on the block, as preparations for the follow-up writing command.

As can be seen from the above, the present invention may effectively protect the memory unit in the flash memory module 130, in order to prevent it from being damaged due to staying in the erase state for too long. In another aspect, since the present invention has preserved the erased block in the spare pool, the latency of writing data can be reduced, that is, there is no need for further waiting for the time of erasing the written block.

Figure 4:
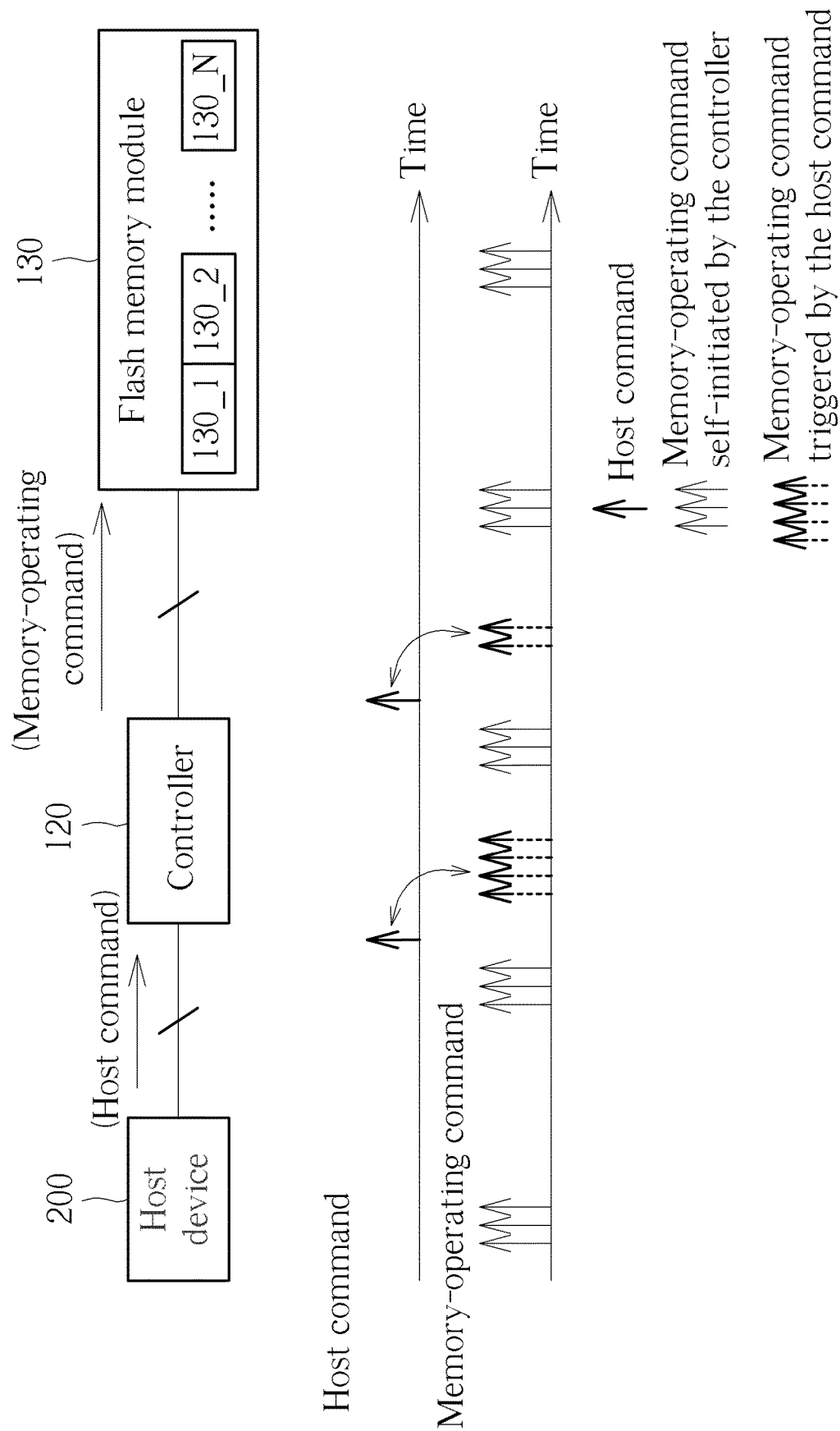
FIG. 4 is a diagram illustrating the interactions between a main control command and a memory-operating command according to an embodiment of the present invention.

Moreover, a feature of the present invention is about how the controller 120 controls the flash memory module 130, which can be referred to FIG. 4. FIG. 4 is a diagram illustrating the interactions between a main control commands and a memory-operating command according to an embodiment of the present invention. When the host device 200 issues a main control command (e.g. a read command or a write command) to the controller 120, the controller 120 may access the flash memory chips 130_1-130_N in the flash memory module 130 according to the access types, addresses and related data comprised in the main control command and converting the above information into a corresponding memory-operating command.

In the present invention, the management on the erased block is independent from the main control command of the host device 200, and is performed according to the timestamp of erased blocks. Hence, even if the host device 200 does not issue the main control command to the controller 120, events (such as an alternative operation of the erased blocks as well as the garbage collection operation) may still be triggered due to the timestamp of the erased blocks in the spare pool 138 exceeding the threshold. Hence, in an embodiment, the controller 120 may issue the following consecutive command sequences to the flash memory chip 130_1-130_N without receiving any access command from the host device 200:

Read: 00 h ALE 30 h
Write: 80 h ALE 10 h
Erase: 60 h ALE D0 h

Initially, if the timestamp of an erased block exceeds a duration limit, Step 240 in the aforementioned process will be triggered to write to erased blocks. As mentioned above, writing to erased blocks may also trigger the garbage collection operation in the meantime. Hence, the first reading command in the aforementioned command sequence is to perform the garbage collection operation, in order to read data from the valid pages in the blocks DB0-DBK that located outside the spare pool 138. The readout data will later be transmitted to the controller 120 to be processed with error correction. Next, the processed data (i.e. the second written command in the aforementioned command sequence) will be written to erased blocks. Lastly, the flow goes to Step 250 to select another block from the spare pool to erase, as an alternative of the erased blocks, i.e. the third erase command in the aforementioned command sequence. As can be further seen from the timing diagram in bottom of FIG. 4, the main control command may trigger the controller 120 to generate associated the memory-operating command, but the controller 120 will remain periodically generating spontaneous memory-operating commands. Therefore, a feature of the present invention lies in that even if the host device 200 has not yet to issue an access command to the controller 120, the controller 120 can nonetheless spontaneously issue successive command sequences (such as those for reading, writing and erasing) to the flash memory module 130.

As mentioned above, via proper management for the spare pool, the present invention may effectively reduce the latency of writing data (by preserving at least one erased block in the spare pool), and may also prevent potential physical damages (by limiting the time the blocks stay in the erase state). Meanwhile, the management mechanism may further combine with the garbage collection operation to perform more suitable writing on the erased blocks or to displace them.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A method for managing a flash memory module, the flash memory module comprises a plurality of blocks, wherein a portion of the plurality of blocks belongs to a spare pool, and the method comprises:

preserving at least one erased block in the spare pool, to facilitate a writing operation, wherein the spare pool comprises at least one erased block and a plurality of written blocks with invalid data, and a number of the written blocks is greater than a number of the at least one erased block;

monitoring an erasing period of the at least one erased block; and when the erasing period exceeds a threshold, executing an alternative operation to replace the at least one erased block, comprising:

choosing a first block among at least one written block in the spare pool, and performing an erasing operation on the first block;

replacing the at least one erased block that has an erasing period exceeding the threshold with the first block; and adding a second block storing invalid data to the spare pool once the at least one erased block is replaced.

2. The method of claim 1, wherein the step of monitoring the erasing period of the at least one erased block comprises:

creating a timestamp associated with the at least one erased block; and periodically performing comparison on the threshold according to time information in the timestamp.

3. The method of claim 1, wherein the step of executing the alternative operation comprises:

performing writing on the at least one erased block.

4. The method of claim 3, wherein the step of performing writing on the at least one erased block comprises:

performing a garbage collection operation on a plurality of blocks in the flash memory module; and utilizing recycled data outputted by the garbage collection operation to perform writing on the at least one erased block.

5. The method of claim 1, further comprising:

if an access command delivered by a host is not received, automatically reading specific data from the flash memory module, and writing the specific data back to the flash memory module.

6. A controller for managing a flash memory module, wherein the flash memory module comprises a plurality of blocks, a portion of the plurality of blocks belongs to a spare pool, and the controller comprises:

a storage unit, arranged to store a program code; and a processing unit, coupled to the storage unit, the processing unit arranged to read the program code from the storage unit in order to execute the program code to perform following operations:

preserving at least one erased block in the spare pool to facilitate a writing operation, wherein the spare pool comprises at least one erased block and a plurality of written blocks with invalid data, and a number of the written blocks is greater than a number of the at least one erased block;

monitoring an erasing period of the at least one erased block; and when the erasing period exceeds a threshold, executing an alternative operation to replace the at least one erased block, comprising:

choosing a first block among at least one written block in the spare pool, and performing an erasing operation on the first block;

replacing the at least one erased block that has an erasing period exceeding the threshold with the first block; and adding a second block storing invalid data to the spare pool once the at least one erased block is replaced.

7. The controller of claim 6, wherein the processing unit executes the program code in order to create a timestamp associated with the at least one erased block; and the processing unit periodically performs comparison on the threshold according to time information in the timestamp.

8. The controller of claim 6, wherein the processing unit executes the program code in order to perform writing on the at least one erased block to execute the alternative operation.

9. The controller of claim 8, wherein the processing unit executes the program code in order to perform a garbage collection operation on a plurality of blocks in the flash memory module; and the processing unit utilizes recycled data outputted by the garbage collection operation to perform writing on the at least one erased block to execute the alternative operation.

10. The controller of claim 6, wherein the controller is controlled by a host, and the processing unit executes the program code in order to automatically read specific data from the flash memory module when an access command delivered by the host is not received, and write the specific data back to the flash memory module.

11. A storage device, comprising:

a flash memory module, comprising a plurality of blocks, wherein a portion of the plurality of blocks belongs to a spare pool; and a controller, arranged to access the flash memory module, and comprising:

a storage unit, arranged to store a program code; and a processing unit, coupled to the storage unit, wherein the processing unit is arranged to read the program code from the storage unit in order to execute the program code, and thereby perform following operations:

preserving at least one erased block in the spare pool to facilitate a writing operation, wherein the spare pool comprises at least one erased block and a plurality of written blocks with invalid data, and a number of the written blocks is greater than a number of the at least one erased block;

monitoring an erasing period of the at least one erased block; and when the erasing period exceeds a threshold, executing an alternative operation to replace the at least one erased block, comprising:

choosing a first block among at least one written block in the spare pool, and performing an erasing operation on the first block;

replacing the at least one erased block that has an erasing period exceeding the threshold with the first block; and adding a second block storing invalid data to the spare pool once the at least one erased block is replaced.

12. The storage device of claim 11, wherein the controller is arranged to create a timestamp associated with the at least one erased block; and the controller periodically performs comparison on the threshold according to time information in the timestamp.

13. The storage device of claim 11, wherein when the erasing period exceeds the threshold, the controller performs writing on the at least one erased block.

14. The storage device of claim 13, wherein when the erasing period exceeds the threshold, the controller performs a garbage collection operation on a plurality of blocks in the flash memory module; and the controller utilizes recycled data outputted by the garbage collection operation to perform writing on the at least one erased block.

15. The storage device of claim 11, wherein the controller is controlled by a host, and when an access command delivered by the host is not received, the controller automatically reads specific data from the flash memory module, and writes the specific data back to the flash memory module.

* * * * *